United States Patent
Carney et al.

(10) Patent No.: US 9,130,970 B2
(45) Date of Patent: Sep. 8, 2015

(54) SYSTEMS FOR ACCELERATING CONTENT DELIVERY VIA DNS OVERRIDING

(71) Applicant: Go Daddy Operating Company, LLC, Scottsdale, AZ (US)

(72) Inventors: Roger Carney, Marion, IA (US); David Koopman, Scottsdale, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 334 days.

(21) Appl. No.: 13/685,245

(22) Filed: Nov. 26, 2012

(65) Prior Publication Data
US 2014/0149601 A1    May 29, 2014

(51) Int. Cl.
| G06F 15/16 | (2006.01) |
| H04L 29/08 | (2006.01) |
| H04L 29/06 | (2006.01) |
| H04L 12/751 | (2013.01) |
| H04L 29/12 | (2006.01) |
| H04L 12/741 | (2013.01) |

(52) U.S. Cl.
CPC ............ *H04L 67/1097* (2013.01); *H04L 45/02* (2013.01); *H04L 45/74* (2013.01); *H04L 61/1511* (2013.01); *H04L 61/609* (2013.01); *H04L 63/10* (2013.01); *H04L 67/18* (2013.01)

(58) Field of Classification Search
CPC ...... H04L 61/1511; H04L 63/10; H04L 45/02
USPC .......... 370/241; 709/201, 223, 225, 241, 245, 709/220, 224, 227, 228
See application file for complete search history.

(56) References Cited

U.S. PATENT DOCUMENTS

| 6,108,703 | A | 8/2000 | Leighton et al. |
| 6,553,413 | B1 | 4/2003 | Leighton et al. |
| 7,624,142 | B2 * | 11/2009 | Jungck ............... 709/201 |
| 7,716,367 | B1 | 5/2010 | Leighton et al. |
| 8,443,106 | B2 * | 5/2013 | Shuster ............... 709/245 |
| 2003/0182447 | A1 * | 9/2003 | Schilling ............. 709/245 |
| 2006/0112176 | A1 * | 5/2006 | Liu et al. ............. 709/223 |
| 2007/0174635 | A1 | 7/2007 | Jones |
| 2008/0177994 | A1 | 7/2008 | Mayer |
| 2009/0164597 | A1 * | 6/2009 | Shuster ............... 709/206 |

FOREIGN PATENT DOCUMENTS

WO    WO2007052285 A2    5/2007

* cited by examiner

*Primary Examiner* — Khanh Dinh
(74) *Attorney, Agent, or Firm* — Quarles & Brady LLP

(57) ABSTRACT

An exemplary system for accelerating content delivery via DNS overriding may comprise a network storage device communicatively coupled to a network and storing a routing table for a CDN, the routing table map one or more edge server IP addresses for one or more edge servers to each of one or more geographic regions. The network storage device may be configured to transmit the routing table to one or more DNS servers communicatively coupled to the network.

22 Claims, 12 Drawing Sheets

Routing Table – 112

Arizona -> 1st IP Address
Texas -> 1st IP Address
Canada -> 1st IP Address

Germany -> 2nd IP Address
Russia -> 2nd IP Address
Egypt -> 2nd IP Address

FIG. 2

Routing Table – 112

| Behavior | Client Geographic Region | Responding IP Address |
|---|---|---|
| Off | 1st Geographic Region | Origin Server IP Address |
| Primary | 1st Geographic Region | 1st IP Address |
| Backup | 1st Geographic Region | Backup 1st IP Address |
| Off | 2nd Geographic Region | Origin Server IP Address |
| Primary | 2nd Geographic Region | 2nd IP Address |
| Backup | 2nd Geographic Region | Backup 2nd IP Address |

FIG. 5

Routing Table – 112

CDN No.: 1

Geographic Region 1 -> 1st IP Address
Geographic Region 2 -> 1st IP Address
Geographic Region 3 -> 1st IP Address Geographic Region 4 -> 2nd IP Address
Geographic Region 5 -> 2nd IP Address
Geographic Region 6 -> 2nd IP Address Routing Table – 112

CDN No.: 2

Geographic Region 7 -> 3rd IP Address
Geographic Region 8 -> 3rd IP Address
Geographic Region 9 -> 3rd IP Address Geographic Region 10 -> 4th IP Address
Geographic Region 11 -> 4th IP Address
Geographic Region 12 -> 4th IP Address

FIG. 8

SYSTEMS FOR ACCELERATING CONTENT DELIVERY VIA DNS OVERRIDING

CROSS REFERENCE TO RELATED PATENT APPLICATIONS

This patent application is related to U.S. patent application Ser. No. 13/685,127 entitled: "DNS OVERRIDING-BASED METHODS OF ACCELERATING CONTENT DELIVERY" concurrently filed herewith and also assigned to Go Daddy Operating Company, LLC.

FIELD OF THE INVENTION

The present inventions generally relate to delivering website content and, more particularly, systems and methods for accelerating content delivery by overriding the domain name system (DNS) to route a request from a client to a geographically-proximal edge server.

SUMMARY OF THE INVENTION

An example embodiment of a system for accelerating content delivery via DNS overriding may comprise a network storage device communicatively coupled to a network and storing a routing table for a CDN. The routing table may map one or more edge server internet protocol (IP) addresses for one or more edge servers to each of one or more geographic regions. The network storage device may be configured to transmit the routing table to one or more DNS servers communicatively coupled to the network.

An example embodiment of a DNS overriding-based method of accelerating content delivery may comprise the steps of at least one server computer generating a routing table for a CDN. The routing table may map one or more edge server IP addresses to each of one or more geographic regions. Additional steps may include the at least one server computer transmitting the routing table to one or more DNS server computers, receiving a request from a registrant of a domain name to subscribe the domain name to the CDN and designating said domain name as subscribed to the CDN in a DNS zone for the domain name.

The above features and advantages of the present inventions will be better understood from the following detailed description taken in conjunction with the accompanying drawings.

BRIEF DESCRIPTION OF THE DRAWINGS

FIG. 2 illustrates a possible embodiment of a routing table within a system for accelerating content delivery.

FIG. 5 is a flow diagram illustrating a possible embodiment of a routing table within a system for accelerating content delivery.

FIG. 8 is a possible embodiment of a routing table used within a system and method for accelerating content delivery.

DETAILED DESCRIPTION

Figure 1:
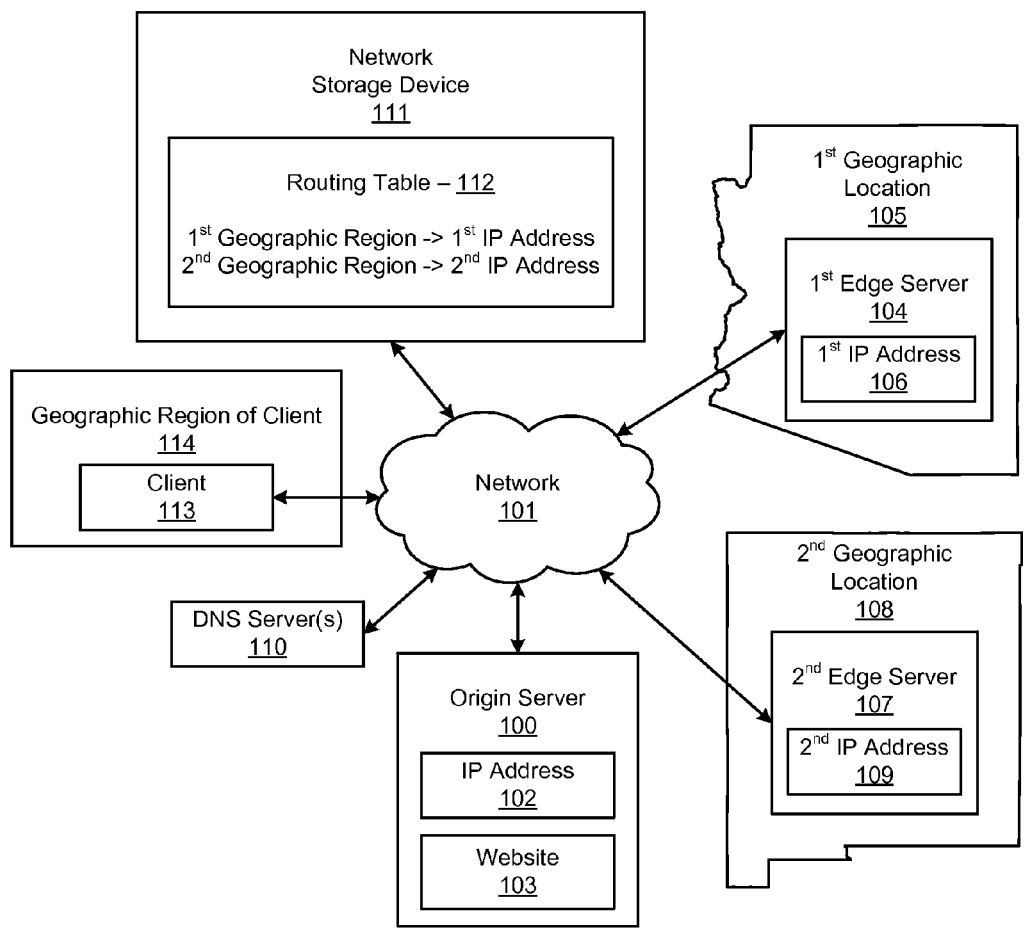
FIG. 1 illustrates a possible embodiment of a system for accelerating content delivery.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as websites. Websites comprise a collection of connected or otherwise related, web pages. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Menus and links may be used to move between different web pages within the website or to move to a different website as is known in the art. Websites may be created using Hyper Text Markup Language (HTML) to generate a standard set of tags that define how the web pages for the website are to be displayed. Such websites may comprise a collection of HTML and subordinate documents (i.e., files) stored on the Web that are typically accessible from the same Uniform Resource Locator (URL) and reside on the same server, although such files may be distributed in numerous servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other web pages at the same website or move to an entirely different website using the browser.

Browsers are able to locate specific websites because each website, resource, and computer on the Internet has a unique IP address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is: http://www.companyname.com. In this example, the "http" identifies the URL as a HTTP request and the "companyname.com" is the domain.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

The DNS is the world's largest distributed computing system that enables access to any resource in the Internet by translating user-friendly domain names to IP Addresses. The process of translating domain names to IP Addresses is called name resolution. A DNS name resolution is the first step in the majority of Internet transactions. The DNS is a client-server system that provides this name resolution service through a family of servers called domain name servers. The hierarchical domain space is divided into administrative units called zones. A zone usually consists of a domain (e.g., example.com) and possibly one or more sub domains (e.g., projects.example.com, services.example.com). The authoritative data needed for performing the name resolution service is contained in a file called the zone file and the DNS servers hosting this file are called the authoritative name servers for that zone.

The DNS infrastructure consists of many different types of DNS servers, DNS clients, and transactions between these entities. An important transaction in DNS is the one that provides the core service of DNS (i.e., name resolution service) and is called the DNS query/response. A DNS query/response transaction is made up of a query originating from a DNS client (generically called a DNS resolver) and response from a DNS name server. In this way, the DNS serves as a global, distributed database. Name servers (serving zone files) each contain a small portion of the global domain space.

The DNS may be maintained by a distributed database system, which may use a client-server model. Specifically, clients may issue a query/request using a domain name and the DNS servers may receive the query/request originating from the client and resolve a domain name to an IP address for a website. The DNS may distribute the responsibility for assigning domain names and may map them to IP networks by allowing an authoritative name server for each domain to keep track of its own changes. Static addressing may be, but is not necessarily, used in some infrastructure situations, such as finding the DNS directory host that may translate domain names to IP addresses. Static addresses may also be used to locate servers or other network hardware inside a network environment such as the disclosed CDN.

A CDN may comprise a system of networked computers, servers, software and other networking components that work together transparently across a network to move content closer to end users for the purpose of improving performance and scalability. A CDN may include one or more network storage devices storing one or more routing tables, one or more origin servers, one or more edge servers and/or one or more DNS servers communicatively coupled to a network.

The origin server(s) may be any server that is "upstream," or higher in the hierarchy of servers or other network components within the network, based on the direction of resolution of a request or response. The edge server(s), possibly one or more clusters of edge servers, may include one or more servers in the CDN wherein software applications, data and/or other computer services have been pushed away from centralized points (such as origin server(s)) to the logical "edges" of the network. Using edge servers, information may be replicated across distributed networks of web servers.

In some CDN models, addressing and routing methodologies may be used to route packets to one or more potential "receiver" network components within a CDN. These addressing and routing methodologies may include "unicast" addressing and routing (a one-to-one association between a destination address and a single receiver endpoint), "broadcast" or "multicast" addressing and routing (a one-to-many association between a single sender and multiple simultaneous receiver endpoints) and "anycast" addressing and routing.

An anycast addressing and routing methodology may route packets from a single "sender" network component to the topologically nearest node in a group of potential "receivers" identified by the same destination address. Anycast may therefore be considered a one-to-one-of-many association. Because DNS is a distributed service over multiple geographically dispersed servers, an anycast routing methodology may be used to route packets to the IP addresses determined by the DNS system. These packets may be routed to the "nearest" point within the CDN announcing a given destination IP address.

As a non-limiting example, a network storage device (storing a routing table), one or more edge servers and one or more DNS servers may be hosted within a single data center. Upon receiving a request to resolve a domain name and/or to retrieve content for a website, the DNS server(s) may determine an IP address to which to route the request. Using an anycast address and routing methodology, the DNS server(s) may determine that the edge server(s) in the same data center comprise the "nearest" point within the CDN that announces the correct destination IP address, and may route the request to the edge server(s) within that data center accordingly. The edge server(s) within the data center may then receive the request and resolve the domain name and/or retrieve the website content accordingly.

Applicant has determined, however, that presently-existing DNS systems and methods using an anycast addressing and routing methodology do not provide optimal means for accelerating content delivery. As a non-limiting example, the request for domain name resolution and/or website content may be routed to a data center that comprises both DNS server(s) and edge server(s). As noted above, the DNS server(s) may use anycast to determine that the edge server(s) in the data center are the nearest point to the DNS server(s) announcing the destination IP address to resolve the request.

The DNS server(s) may make this determination because the DNS server(s) acts as the reference point to determine the "nearest" edge server(s) announcing the destination IP address. However, a second edge server, which also announces the destination IP address, may be running in a data center geographically closer to the requesting client and would provide optimal content delivery acceleration because of its proximity to the client, but may be running in a data center that does not include a DNS server. Because presently-existing DNS systems use the DNS server as the reference point for anycast addressing and routing, the edge server(s) within the data center that includes the DNS server(s) will be considered the "nearest" point, as opposed to the edge server(s) that are, in fact, the "nearest" point to the client that issued the request and that would therefore provide the optimal content delivery acceleration within the CDN.

Applicant has therefore determined that optimal content delivery may be accomplished by configuring a CDN to override the DNS system to route a request from a client to a geographically-proximal edge server.

Systems for Accelerating Content Delivery

FIG. 1 illustrates an embodiment of a system for accelerating content delivery by configuring a CDN to override the DNS system to route a request from a client to a geographically-proximal edge server. The CDN for the present inventions may comprise one or more clients 113, one or more network storage devices 111, one or more origin servers 100, a plurality of edge servers 104, 107 and/or a plurality of DNS servers 110 communicatively coupled to a network 101.

The example embodiments illustrated herein place no limitation on network 101 configuration or connectivity. Thus, as non-limiting examples, the network 101 could comprise the Internet, the public switched telephone network, the global Telex network, computer networks (e.g., an intranet, an extranet, a local-area network, or a wide-area network), wired networks, wireless networks, or any combination thereof. System components may be communicatively coupled to the network 101 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The one or more network storage devices 111 may store a routing table 112 for the CDN that maps one or more server IP addresses 106, 109 to each of one or more geographic regions, and may be configured to transmit the routing table 112 to any of the one or more servers, possibly to the plurality of DNS servers 110. The network storage device(s) 111 may be, as non-limiting examples, one or more routers, switches, servers, database servers or any other network 101 hardware or software capable of generating, storing and/or transmitting a routing table 112. The routing table(s) 112 may include one or more electronic tables, files and/or database objects that store the routes and/or metrics associated with those routes to particular network 101 destinations.

The routing table 112 may be stored within a database or other storage area in the network storage device 111 and/or within a database and/or cache of any networked computer or network component. The information on the routing table 112 may further include information about the utilization of the network 101 around it, as described herein. In one non-limiting example embodiment, the network storage device may comprise a database server running a database storing the routing table 112. Any database and/or data storage described herein may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

The one or more origin servers 100 may be any server that is "upstream," or higher in the hierarchy of servers or other network 101 components within the network 101, based on the direction of resolution of a request or response. The origin server(s) 100 may have an origin server IP address 102 and may host one or more websites 103. The website(s) 130 may comprise any collection of data and/or files accessible to a client 113 or server communicatively coupled to the network 101. As a non-limiting example, website(s) 103 may comprise a single webpage or multiple interconnected and related web pages, resolving from a domain name, each of which may provide access to static, dynamic, multimedia, or any other content, perhaps by accessing files (e.g., text, audio, video, graphics, executable, HTML, eXtensible Markup Language (XML), Active Server Pages (ASP), Hypertext Preprocessor (PHP), Flash files, server-side scripting, etc.) that enable the website 103 to display when rendered by a browser on a client 113 or server. The website's 103 files may be organized in a hosting server's file system that may organize the files for the storage, organization, manipulation, and retrieval by the hosting server's operating system. A hosting server's file system may comprise at least one directory that, in turn, may comprise at least one folder in which files may be stored. In most operating systems, files may be stored in a root directory, sub-directories, folders, or sub-folders within the file system.

The one or more edge servers 104, 107 may include one or more servers in the CDN wherein software applications, data and/or other computer services have been pushed away from centralized points (such as origin server(s) 100, for example) to the logical "edges" of the network 101. Using edge servers 104, 107, information may be replicated across distributed networks of web servers. The plurality of edge servers 104, 107 may include at least a first edge server 104 in a first geographic location 105 having a first IP address 106 and a second edge server 107 in a second geographic location 108 having a second IP address 109. Each IP address disclosed herein may be any IP address associated with network hardware or software within the network 101. As non-limiting examples, an IP address may be an origin IP address 102 associated with an origin server 100, a first IP address 106 associated with a first edge server 104 or a second IP address 109 associated with a second edge server 107. The routing table 112 on the network storage device 111 (or any other network device and/or software as disclosed herein) may likewise contain a route/path used to direct network traffic for an IP Address to the appropriate network hardware and/or software in the appropriate geographic region.

Any geographic region(s) and/or geographic location(s) disclosed herein may comprise, as non-limiting examples, a country, a state, a region of a country, a continent or a region of a continent. As non-limiting examples, the geographic location for each of the IP addresses for the client, the first, second or any additional edge server(s) 104, 107 or any other network hardware or software may be mapped to a geographic region including a country, a state, a region of a country, a continent or a region of a continent.

The one or more origin servers 100, the plurality of edge servers 104, 107, the plurality of DNS servers 110, the one or more database servers and/or any other server(s) described herein may comprise any computer or program that provides services to other computers, programs, or users either in the same computer or over a computer network 101. As non-limiting examples, the one of more servers could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

Any of these servers may comprise a computer-readable storage media storing instructions that, when executed by a microprocessor, cause the server(s) to perform the steps for which they are configured. Such computer-readable media may comprise any data storage medium capable of storing instructions for execution by a computing device. It may comprise, as non-limiting examples, magnetic, optical, semi-conductor, paper, or any other data storage media, a database or other network storage device, hard disk drives, portable disks, CD-ROM, DVD, RAM, ROM, flash memory, and/or holographic data storage. The instructions may, as non-limiting examples, comprise software and/or scripts stored in the computer-readable media that may be stored locally in the server(s) or, alternatively, in a highly-distributed format in a plurality of computer-readable media accessible via the network 101, perhaps via a grid or cloud-computing environment.

Such instructions may be implemented in the form of software modules. Any software modules described herein may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on one or more server(s) containing instructions (perhaps stored in computer-readable media accessible by the server computer's computer processor) that, when executed by the computer processor, cause the server computer to perform the steps for which it is configured.

The edge server(s) 104, 107 and the DNS server(s) 110 may comprise proxy servers and/or DNS proxy servers. These proxy servers may comprise one or more intermediary services between one or more servers and one or more clients 113. The proxy server(s) may be configured to accelerate hosting by caching the routing table 112 and/or web content for the website 103. As a non-limiting example, the one or more edge servers may comprise a caching proxy server that may cache the content of a website and/or a routing table.

Responses to requests for actions by the one or more servers may be accelerated because caching the routing table 112 and/or the web content of the website 103 may eliminate computational overhead and network traffic created by one or more web servers on the edge servers fetching content from file storage on the origin server 100. The one or more proxy servers may also eliminate computational overhead and network traffic created by numerous calls to a database on the origin server 100.

The client(s) 113 may be any computer or program that provides services to other computers, programs, or users either in the same computer or over a computer network 101. As non-limiting examples, the client(s) 113 may be an application, communication, mail, database, proxy, fax, file, media, web, peer-to-peer, or standalone computer, cell phone, "smart" phone, personal digital assistant (PDA), etc. that may contain an operating system, a full file system, a plurality of other necessary utilities or applications or any combination thereof on the client 113. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

Client software may be used for authenticated remote access to one more hosting computers or servers, described herein. These may be, but are not limited to being accessed by a remote desktop program and/or a web browser, as are known in the art. Any browser described herein may comprise any software application for retrieving, presenting, and traversing information resources on the Web including, but not limited to, the website(s) 103 described in detail herein.

The DNS server(s) 110 may be configured to determine whether the domain name to be resolved is subscribed to the CDN. In some embodiments, this may be accomplished by querying a DNS zone file associated with the domain name to be resolved. A DNS zone file may comprise a text file that describes a DNS zone and comprises mappings between domain names and IP addresses and other resources. The DNS zone may comprise a subset (often a single domain) of the hierarchical domain name structure of the DNS. The DNS zone file may be a master file (authoritatively describing a zone) or may list the contents of a DNS cache. The starting point of each DNS zone may be specified though use of the $origin keyword within the zone file. The DNS zone file may be organized in the form of resource records (RR). Each DNS zone and/or RR may comprise several fields, possibly including type-specific data fields.

As a non limiting example, during or subsequent to a domain name registration, a request may be received to subscribe the domain name to one or more CDNs. The domain name may be added as a "zone" within a zone file. The zone for the domain name within the DNS zone file may be designated and marked as subscribing the domain name to the one or more CDNs (possibly by adding a type-specific data field to the DNS zone for the domain name), indicating that the registered domain name has been subscribed to the chosen CDN(s) and/or including information defining the CDN to which the domain name is subscribed.

The DNS zone may further comprise one or more address records used to resolve the domain name to a particular IP address. These records may be abbreviated as A-records for IPv4 IP addresses, or as AAAA-records for IPv6 IP addresses. In some embodiments, these address records may be used by the DNS server(s) 110 to determine the origin server IP address for the domain name. As a non-limiting example, the DNS server(s) 110 may be configured to query the DNS zone file for the origin server 100 IP address 102 for the domain name. The DNS server(s) 110 may isolate the DNS zone for the domain name, possibly using the $origin keyword within the zone for that domain name, and search the DNS zone for information about the domain name, possibly including the origin server 100 IP address 102 for the domain name, the A and AAAA-records for the domain name and any type-specific fields designating the domain name as subscribed to the CDN.

If the domain name is not subscribed to the CDN, the DNS server(s) 110 may respond to the request to resolve the domain name with the IP address 102 for the origin server 100. However, if the domain name is subscribed to the CDN, the DNS server(s) 110 may be configured to determine a geographic region 114 for the client 113.

In some embodiments, the DNS server(s) 110 may be configured to determine the geographic region 114 for the client 113 by performing an IP address geolocation on an IP address for any of the client, an ISP 400 for the client 113, or one or more other DNS server computers 110. This geolocation may comprise identification of the geographic location of the client 113, the client's ISP 400 or the other DNS server computer(s) 110 and associate this geographic location with an IP address, MAC address, image metadata, etc. by automatically looking up the IP address within a geolocation database that contains the IP address data used in firewalls, ad servers, routing, mail systems, web sites and other automated systems and retrieving a user's physical address. The IP address may also be associated with geographic region information such as country, region, city, state, postal/zip code, latitude, longitude, time zone, etc.

Figure 4:
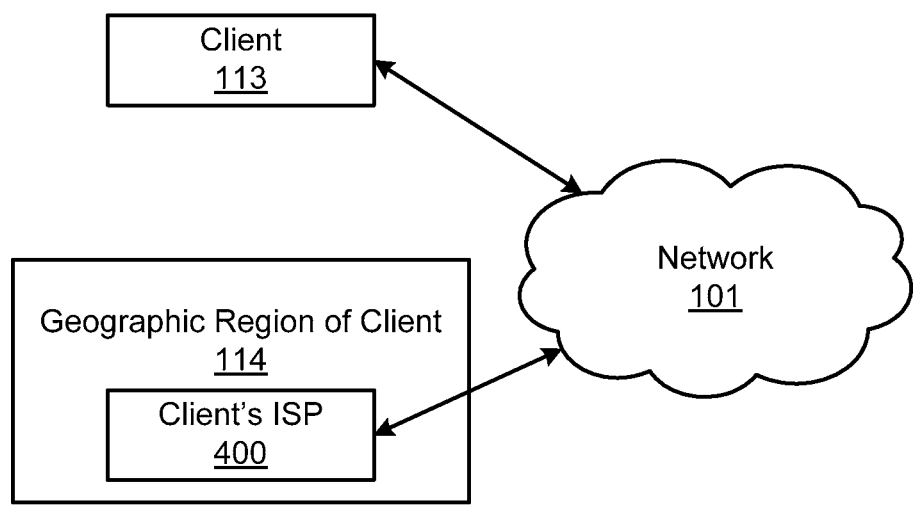
FIG. 4 illustrates a possible embodiment of a system for accelerating content delivery.

In some embodiments, the geolocation may be determined by obtaining the country code for a given IP address through a DNS-based Blackhole List (DSNBL)-style lookup from a remote server. Additional "deeper" data sets in a geolocation database may be used to determine other geolocation parameters such as domain name, connection speed, ISP, language, proxies, company name, etc. As seen in FIG. 4, the location may be the actual location of the client 113 performing the request or an actual assessed location. In this example embodiment, the client's ISP 440 may be used to determine the geographic region 114 of the client 113. In other embodiments, one or more other DNS server(s) 110 may be used to determine the geographic region 114 of the client 113.

If the geographic region 114 for the client 113 is mapped in the routing table 112 to a first IP address 106, the DNS server(s) 110 may be configured to respond to the request to resolve the domain name with the first IP address 106. Likewise, if the geographic region 114 for the client 113 is mapped in the routing table 112 to a second IP address 109, the DNS server(s) 110 may be configured to respond to the request to resolve the domain name with the second IP address 109.

FIG. 2 represents a non-limiting illustration of this functionality by the CDN. In this example, the routing table 112 comprises a first IP address 106 and a second IP address 109. Six geographic regions are represented in this example. Each of the first three geographic regions (Arizona, Texas and Canada) may represent a first geographic region 114 for a client 113 subscribed to the CDN that may be mapped to a first IP address 106 for a first edge server 104 at a first geographic location 105. Each of the second three geographic regions (Germany, Russia and Egypt) may represent a second geographic region 114 for a client 113 subscribed to the CDN that may be mapped to the second IP address 109 for a second edge server 107 at a second geographic location 108.

Figure 3:
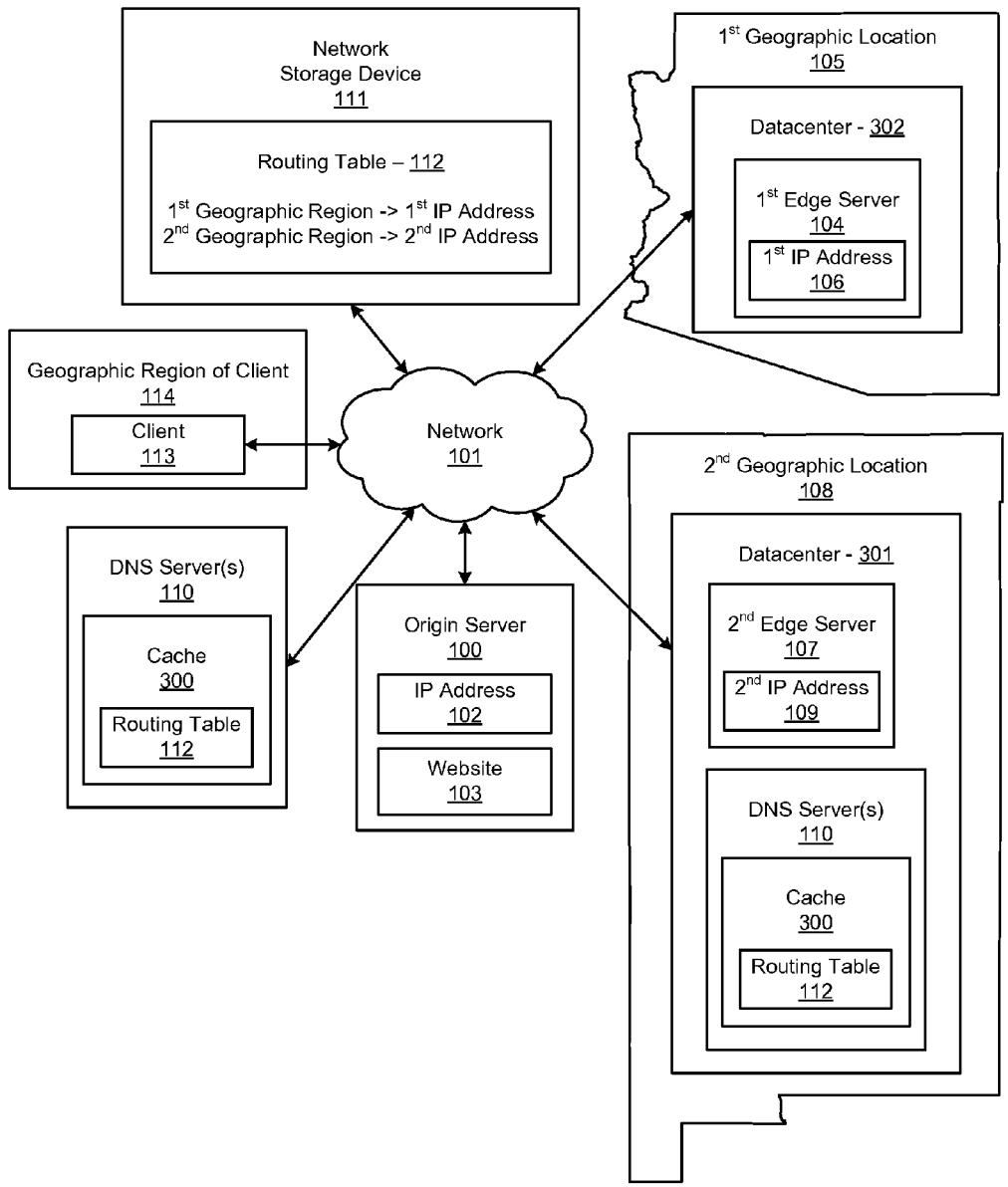
FIG. 3 illustrates a possible embodiment of a system for accelerating content delivery.

As seen in FIG. 3, each of the plurality of edge servers and each of the plurality of DNS server(s) 110 may be hosted in one or more data centers 301, 302. Although not shown in FIG. 3, the origin server(s) 100, any additional DNS server(s) 110 and/or database servers, the network storage device(s) 111 and/or any other server(s) and/or network hardware and/or software used by the CDN may also be hosted in one or more data centers such as the data center 302 in the first geographic region 105 or the data center 301 in the second geographic region 108.

The data center(s) may provide hosting services for websites, services or software relating to the domain information, or any related hosted website including, but not limited to hosting one or more computers or servers in the data center(s) as well as providing the general infrastructure necessary to offer hosting services to Internet or other network users including hardware, software, Internet web sites, hosting servers, and electronic communication means necessary to connect multiple computers and/or servers to the Internet or any other network.

A comparison of data center 301 and data center 302 in FIG. 3 illustrates that at least one of the plurality of edge servers (specifically first edge server 104) is running in a datacenter not comprising one of the plurality of DNS servers 110. In this example embodiment, datacenter 301 comprises both the second edge server 107 as well at least one of the plurality of DNS servers 110. By contrast, datacenter 302 comprises a datacenter running the first edge server 104, but does not comprise one of the plurality of DNS servers.

As a non-limiting example, the CDN may receive a request to resolve a domain name and/or retrieve cached web content from client 113 where the geographic region 114 of client 113 is in the same first geographic region 105 as datacenter 302, which is running edge server(s) 104, but does not comprise DNS server(s) 110.

From a content delivery acceleration perspective, the edge server 104 in datacenter 302 would be the optimal edge server to act as a proxy server to serve cached website 103 content to the client 113 that made the request, because of its physical proximity to the client 113. However, because data center 302 does not comprise DNS server(s) 110, the DNS will route the request to datacenter 301 in a second geographic location 108, which does comprise DNS server(s) 110. An anycast addressing and routing methodology, using DNS server(s) 110 in datacenter 301 as a reference point, may recognize a second edge server 107 as the "nearest" proxy server to DNS server(s) 110 with the desired website 103 content.

The disclosed invention provides methods and systems for configuring the CDN to override the DNS system to route a request from the client 113 to the nearest geographically-proximal edge server 104, 107. Specifically, the DNS server(s) 110 may be configured to receive, from a client 113 in a geographic region 114, the request to resolve a domain name to an IP address for a website 103, and if the domain name is subscribed to the CDN, the DNS server(s) 110 may be configured to determine the geographic region 114 for the client 113, and override the DNS system by responding to the request with an IP address 106, 109 to which the geographic region 114 of the client 113 is mapped in a routing table 112, thereby optimizing content delivery acceleration to the client 113.

Figure 6:
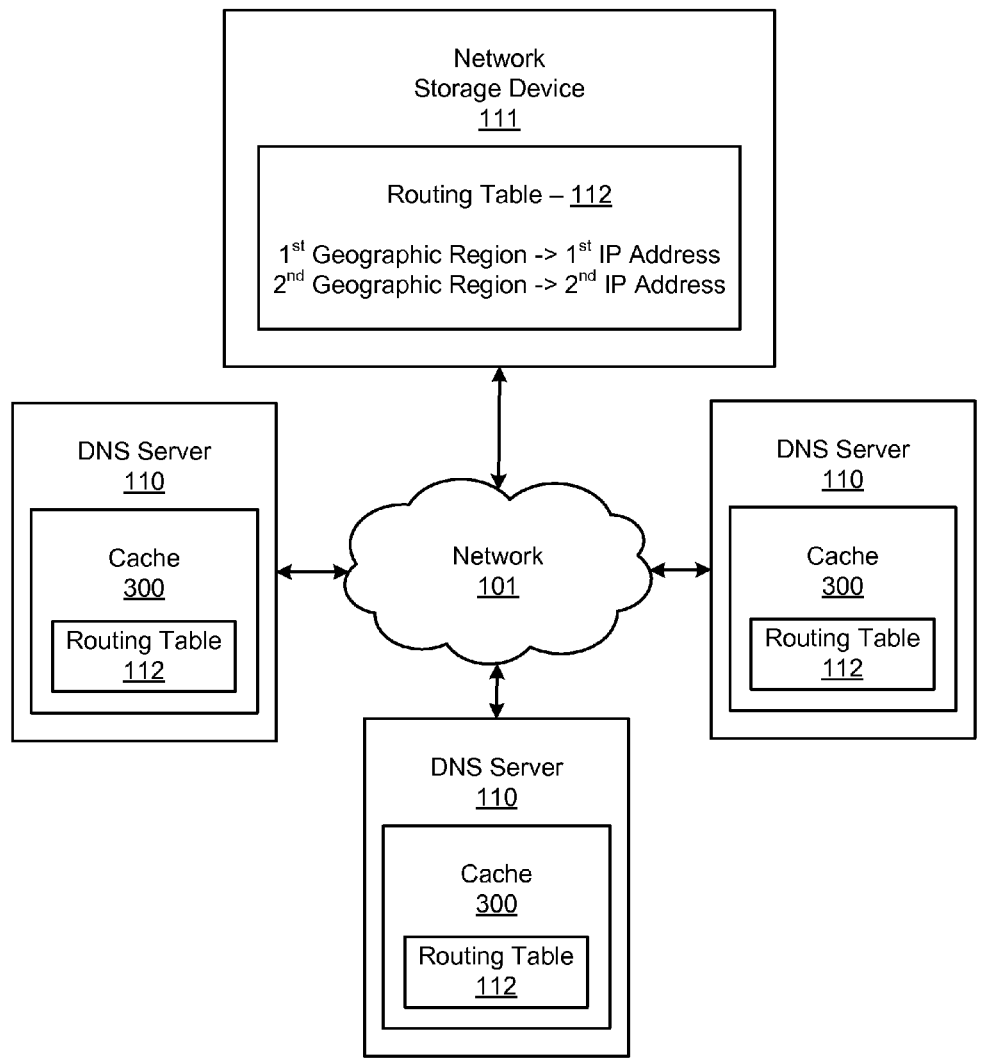
FIG. 6 is a flow diagram illustrating a possible embodiment of a system for accelerating content delivery.

FIGS. 3 and 6 show that network storage device 111, comprising a database server running a database storing the routing table 112, may be configured to generate and transmit the routing table 112 to the DNS server(s) 110 and periodically update the routing table 112 in the cache memory 300 of the DNS server(s) 110.

The network storage device 111, which may comprise a database server running a database storing at least the routing table 112, may be configured to generate the routing table 112 in several ways. As non-limiting examples, the CDN may comprise a provisioning system configured to extrapolate previously-entered information to determine the IP address(es) and the destination hardware resource(s) on which to instantiate the IP address(es). In some embodiments, the provisioning information may be extrapolated via static routing, which may include the use of fixed routes that may be manually entered by an administrator of a network into, for example, a network router or database server's configuration. Using this configuration information, all routing decisions may be predetermined and remain static. When network changes occur, the administrator may update the router configuration to include the changes. Static routing may be ideal in small network environments.

In other embodiments, the provisioning information may be extrapolated via routing protocols that gather and share the routing information used to maintain and update routing tables and that allow the network to dynamically adjust to changing conditions. This routing information may in turn be used to route a routed protocol to its final destination. A routing protocol may further be a formula used by routers or other network 101 components to determine the appropriate path onto which data should be forwarded and may specify how routers or other network 101 components report changes and share information with other routers or other network 101 components in a network 101 that they can reach.

Such routing protocols may include link state protocols (e.g., Open Shortest Path First or "OSPF" and Intermediate System to Intermediate System or "IS-IS"), which use link state routing to construct a map of the connectivity of the network, send information about each node's neighbors to the entire network and independently calculate the best next hop for each possible destination in the network. These routing protocols may also include distance-vector routing protocols (e.g., Routing Information Protocol or "RIP," Interior Gateway Routing Protocol or "IGRP," Exterior Gateway Protocol or "EGP" or Border Gateway Protocol or "BGP"), which have each node share its routing table with its neighbors to calculate paths using less computational complexity and message overhead. Routing protocols may be ideal in large network environments. The generation of the routing table 112 may therefore be the primary goal of routing protocols and static routes.

In still other embodiments described in more detail below, information for generating the routing table 112 may be queried or extrapolated from a DNS zone file. As a non-limiting example, if the routing table 112 is not cached on the DNS server(s) 110, the DNS zone file for the domain name may be fetched and data for the routing table 112 may be extracted or extrapolated from the DNS zone file. Such data may be extracted from the fields within the DNS zone for the domain name and may include, as non-limiting examples, the A and/or AAAA-records, the CDN the domain name is subscribed to, location information that the IP addresses are mapped to, etc.

In other words, the zone file may be used as a starting point for compiling the zone file data into database format. The routing table 112 and/or database may further be updated with additional information from the domain name zone and/or zone file. As a non-limiting example, each generated routing table 112 may comprise a CDN data field identifying the CDN to which each routing table 112 corresponds.

Once generated, the database server may be configured to transmit the routing table 112 to the DNS server(s) 110. In some embodiments, the database server may transmit the routing table 112 to the DNS server(s) 110 via a replication chain. Such replication may include a set of technologies for copying and distributing data and database objects from one database to another, possibly over local or wide area networks 101, such as the Internet, and synchronizing between databases to maintain consistency.

This replication may enable data from a master server, possibly a database server comprising a relational database, to be replicated to one or more slave servers, possibly additional database servers each comprising one or more relational databases. In some embodiments, where the databases change on a regular basis, the replication may be transactional replication. In this model a software agent and/or signal monitor may monitor the master database server, or "publisher" for changes in data and transmit those changes to the slave databases or "subscribers," either immediately or on a periodic basis.

As a non-limiting example in the context of the current embodiments, network storage device 111 may generate a routing table 112 and store it within a SQL database on the network storage device 111. The network storage device 111 may replicate the routing table 112 via a replication chain, to the DNS server(s) 110, each of which may temporarily store the routing table in a cache memory 300.

The database server may periodically update the routing table in the cache memory of the DNS server(s) 110. In some embodiments, this update may be responsive to a lost connection between the network storage device 111 (possibly acting as the database server) and the DNS server(s) 110. The loss of connection may be determined by a signal that may be a limited form of inter-process communication used as a notification sent to a process or to a specific thread within the same process in order to notify it of an event that occurred, in this case a connection loss or closed terminal. If the process has previously registered a signal handler, that routine is executed. Otherwise a default signal handler may be executed.

In some embodiments, the signal may be a hangup (possibly a SIGHUP) signal sent to or from a process on the network storage device 111 when a controlling, pseudo or virtual terminal has been closed (possibly due to a system shut down or reboot) between the network storage device 111 and the DNS server(s) 110. Thus, in response to a hangup signal, possibly a SQL hangup signal between the network storage device 111 and the SQL server(s) 110, the database server may be configured to run a process to update the routing table 112 in the cache memory 300 of the DNS server(s) 110.

In some embodiments that utilize a TCP "keepalive" parameter, the network storage device 111 comprising the database server and/or the DNS server(s) 110 may monitor a connection between them. If the keepalive parameter determines that this connection is no longer set to "on," this may be considered the "transaction" that causes the database server to refresh the routing table 112 stored on the DNS server(s) 110 with a new copy of the routing table 112 from the network storage device 111. This keepalive parameter may also be used to maintain a connection between the origin server 100 and the edge server(s) to accelerate delivery of dynamic content for the website 103.

FIG. 4 demonstrates that the request to resolve the domain name may be received by one of the DNS server(s) 110 directly from the client 113, an internet service provider 400 for the client 113 or one or more other DNS servers 110. Furthermore, FIG. 4 demonstrates that the geographic region 114 of the client 113 may be determined by performing an IP address geolocation on an IP address for the client 113. As seen in FIG. 4, this may include not only the client's actual location but also an actual assessed location. In this example embodiment, the client's ISP 400 may be used to determine the geographic region 114 of the client 113. In other embodiments, one or more other DNS server(s) 110 may be used to determine the geographic region 114 of the client 113.

FIG. 5 demonstrates an example routing table 112 used by the DNS server(s) 110 after determining whether domain name to be resolved is subscribed to a CDN. The routing table 112 may comprise a behavior field storing values for behaviors corresponding to a plurality of geographic regions 114 for the location of the client 113 that issued the request to resolve the domain name. The behavior for each of the client geographic regions may further correspond to a responding edge server's 104, 107 IP address 106, 107 for resolving the domain name and/or serving content for the requested website.

As a non-limiting example, if it is determined by the DNS server(s) 110 that the domain name is subscribed to a CDN, and further determined that the behavior field in the routing table 112 for the geographic location 114 for the client 113 comprises an "off" designation, the DNS server(s) 110 may be configured to respond to the request to resolve the domain name with an origin server computer 100 IP address 102 for the domain name. Using the example routing table 112 in FIG. 5, if the domain name is subscribed to the CDN, the client 113 requests resolution of the domain name from the first geographic region or second geographic region and the behavior for the client 113 at a location 105, 106 in either of these regions includes an "off" designation, the DNS server(s) 110 may resolve the domain name to content from the origin server 100.

Using the example routing table 112 in FIG. 5, if the domain name is subscribed to the CDN, the client 113 requests resolution of the domain name from the first geographic region and the behavior for the client 113 at a location in the first geographic region 105 includes a "primary" designation, the DNS server(s) 110 may resolve the domain name with a first primary IP address 106 for an edge server 104 in the first geographic region. Likewise, if the client 113 requests resolution of the domain name from the second geographic region and the behavior for the client 113 at a location 108 in the second geographic region includes a "primary" designation, the DNS server(s) 110 may resolve the domain name with a second primary IP address 109 for an edge server 107 in the second geographic region.

Using the example routing table 112 in FIG. 5, if the domain name is subscribed to the CDN, the client 113 requests resolution of the domain name from the first geographic region and the behavior for the client at a location 105 in the first geographic region includes a "backup" designation, the DNS server(s) 110 may resolve the domain name with a backup first IP address 106 for an edge server 104 in the first geographic region. Likewise, if the client requests resolution of the domain name from the second geographic region and the behavior for the client 113 at a location 108 in the second geographic region includes a "backup" designation, the DNS server(s) 110 may resolve the domain name with a second backup IP address 109 for an edge server 107 in the second geographic region.

FIG. 6 represents a highly distributed embodiment of the disclosed inventions. In these embodiments, the network storage device 111 may generate and transmit the routing table 112 to a plurality of DNS servers 110 each storing the received routing table 112 in a cache 300 as previously disclosed.

Thus, in the disclosed embodiments, the CDN may be configured to override the DNS system to route a request from a client 113 to a geographically-proximal edge server 104, 107. This may be accomplished according to the CDN environment depicted in FIGS. 1, 3, 4 and 6 using routing tables such as those depicted in FIGS. 2 and 5.

Methods for Accelerating Content Delivery

Figure 7:
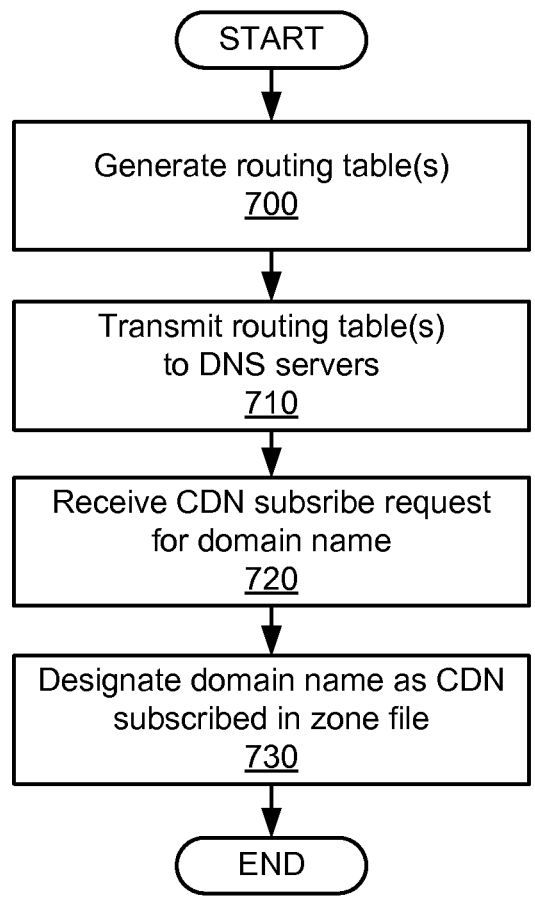
FIG. 7 is a flow diagram illustrating a possible embodiment of a method for accelerating content delivery.

FIG. 7 illustrates an embodiment of a method of accelerating content delivery, wherein the CDN is configured to override the DNS system to route a request from a client 113 to a geographically-proximal edge server 104, 107. This embodiment may comprise the steps of generating one or more routing tables 112 for one or more CDN (the routing table 112 mapping one or more edge server 104, 107 IP addresses 105, 109 to each of one or more geographic regions) (Step 700), transmitting the routing tables to the DNS server(s) 110 (Step 710) as described herein, and receiving a request to subscribe the domain name to a CDN (Step 720).

As non-limiting examples, the CDN subscribe request may be received from a registrant of a domain name as the domain name is registered with a registrar, and/or may be received from a website owner as the website is developed and/or hosted by a hosting provider. In some non-limiting embodiments, the request may be received via a "dashboard" or other control panel on a registrar and/or hosting provider website. After the CDN subscribe request is received, the DNS zone for the domain name may be updated to designate the domain name as CDN subscribed (Step 730).

FIG. 8 illustrates an example of a plurality of routing tables used to accelerate content delivery within a CDN. In this example embodiment, the step of at least one server computer generating a routing table (Step 700) may further comprise generating a second through an nth routing table 112 corresponding to a second through an nth CDN. Likewise, the step of transmitting the routing table 112 to the DNS server(s) 110 (Step 710) may further comprise the step of transmitting the second through the nth routing table 112 to the DNS server(s) 110.

This principle may be demonstrated as illustrated in FIG. 8, where a first routing table 112 for CDN 1 and a second routing table 112 for CDN 2 each have been generated. In this example embodiment, each routing table 112 may comprise a "CDN No." data field identifying the CDN to which each routing table 112 corresponds. The routing table 112 data for each CDN may further comprise one or more IP addresses within the CDN, and each of these IP addresses may be mapped to one or more geographic regions.

In FIG. 8, the routing table 112 data for CDN 1 may include a first and a second IP address 106, 109. The first IP address 106 may be mapped to Geographic Regions 1, 2 and 3 in the routing table 112 and the second IP address 109 may be mapped to Geographic Regions 4, 5 and 6 in the routing table 112. The routing table 112 data for CDN 2 may include a third and fourth IP address. The third IP address may be mapped to Geographic Regions 7, 8 and 9 in the routing table 112 and the fourth IP address may be mapped to Geographic Regions 10, 11 and 12 in the routing table 112.

Figure 9:
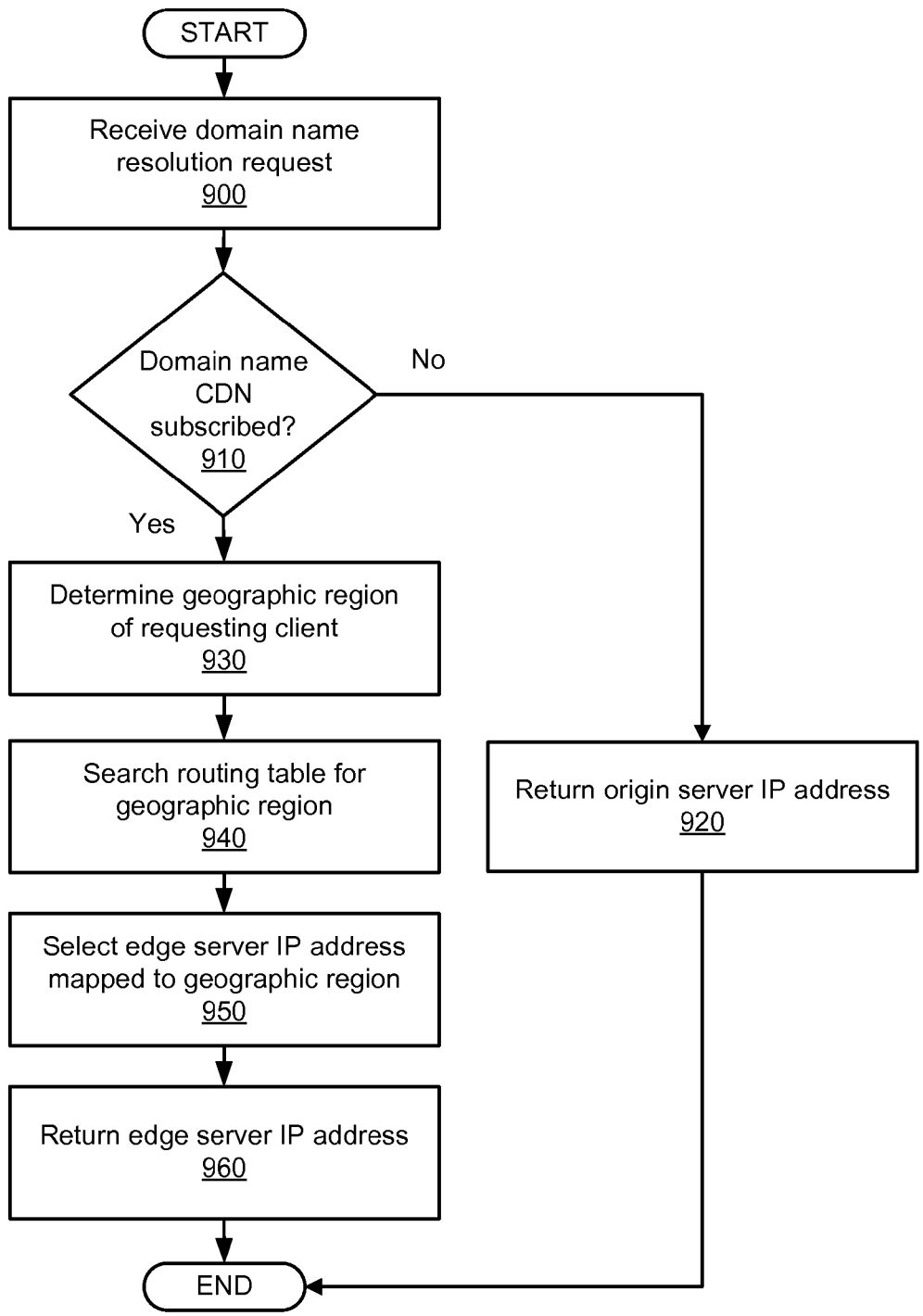
FIG. 9 is a flow diagram illustrating a possible embodiment of a method for accelerating content delivery.

FIG. 9 illustrates an alternate embodiment of a method of accelerating content delivery in a CDN. This embodiment may comprise the steps of one or more DNS servers 110 receiving a request from a client 113 to resolve a domain name to an IP address for a website (Step 900) and determining whether the domain name is subscribed to a CDN (Step 910). If the domain name is determined not to be subscribed to the CDN, the request to resolve the domain name may be responded to and return an origin server 100 IP address 102 for the domain name (Step 920).

As seen in FIG. 9, if the domain name is determined to be subscribed to a CDN, further steps may comprise the DNS server(s) 110 determining the geographic region 114 of the requesting client 113 (Step 930), searching a routing table 112 that maps one or more edge server 104, 107 IP addresses 106, 109 to each of one or more geographic regions, for the geographic region for the client 113 (Step 940), selecting an edge server 104, 107 IP address 106, 109 mapped in the routing table 112 to the geographic region 114 for the client 113 (Step 950) and responding to the request to resolve the domain name by returning the IP address 106, 109 for the edge server 104, 107 (Step 960).

Figure 10:
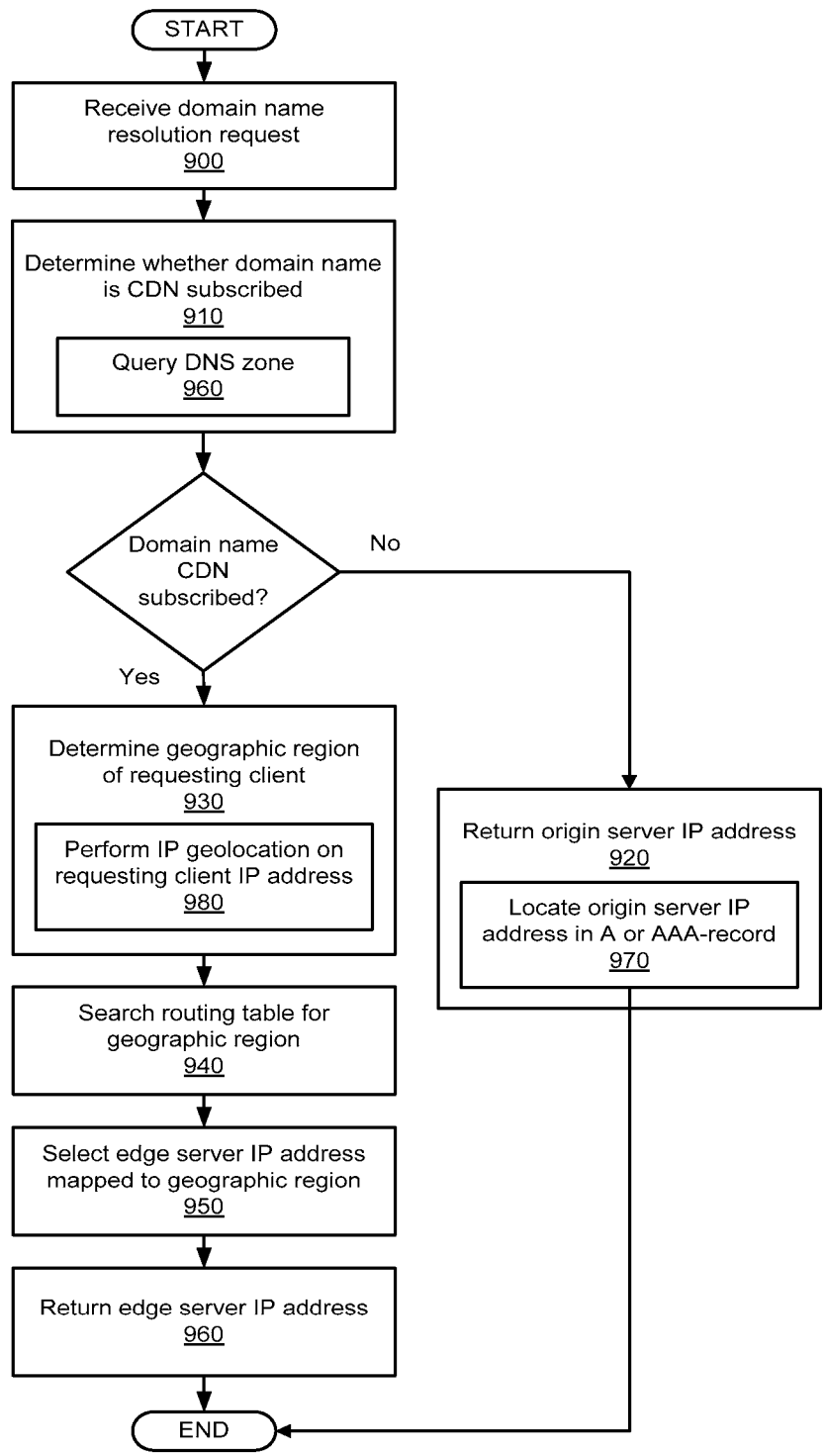
FIG. 10 is a flow diagram illustrating a possible embodiment of a method for accelerating content delivery.

FIG. 10 illustrates an alternate embodiment of a method of accelerating content delivery in a CDN wherein: the step of determining whether the domain name is subscribed to a CDN (Step 910) further comprises the step of querying the DNS zone (possibly within the DNS zone file) for the domain name to determine if the DNS zone has been marked for and/or is subscribed to any of one or more CDNs; the step of identifying, locating and/or returning the origin server 100 IP address 102 (step 920) further comprises the step of locating the origin server 100 IP address 102 in the A or AAAA-record of the DNS zone for the domain name and/or the routing table 112 (Step 970); and the step of determining the geographic region of the requesting client 113 (Step 930) further comprises the step of performing an IP geolocation on the requesting client 113 IP address (Step 980) as disclosed herein.

Figure 11:
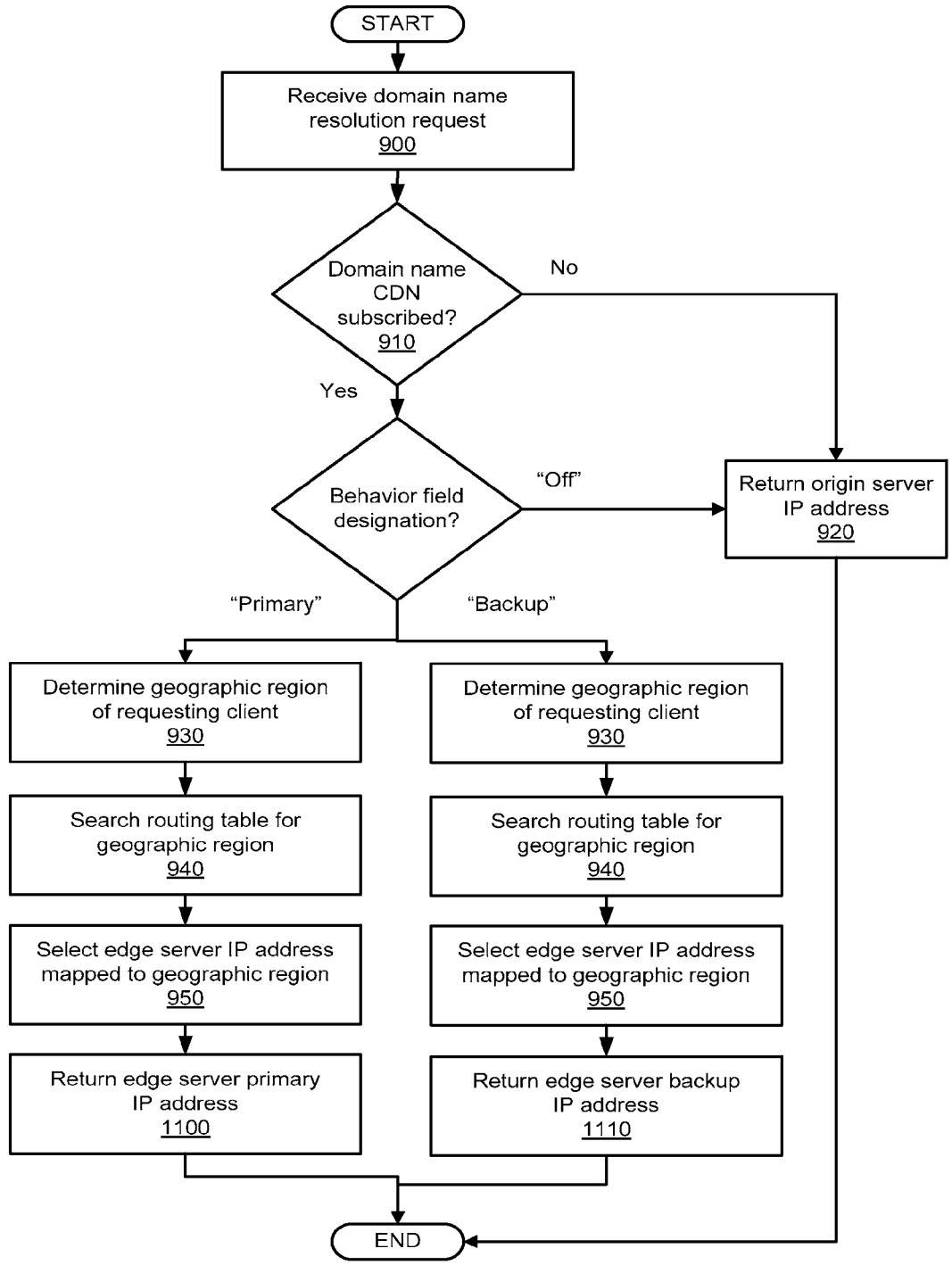
FIG. 11 is a flow diagram illustrating a possible embodiment of a method for accelerating content delivery.

FIG. 11 illustrates an alternate embodiment of a method of accelerating content delivery in a CDN further comprising: subsequent to the step of determining whether the domain name is CDN subscribed (Step 910), determining a behavior field designation in the routing table 112 for the geographic region for the IP address. If the behavior designation is "Off," the origin server 100 IP address 102 may be returned. Regardless of whether the behavior field designation is "Primary" or "Backup," the steps of determining a geographic region 114 of the requesting client 113 (Step 930), searching a routing table 112 for the geographic region (Step 940) and selecting an edge server 104, 107 IP address 106, 109 mapped to the geographic region (Step 950) may be performed. If the behavior field designation is "Primary," the edge server 104, 107 primary IP address may returned (Step 1100) and if the behavior field designation is "Backup," the edge server 104, 107 backup IP address may be returned (Step 1110).

Example Use of Systems and Methods for Accelerating Content Delivery

Figure 12:
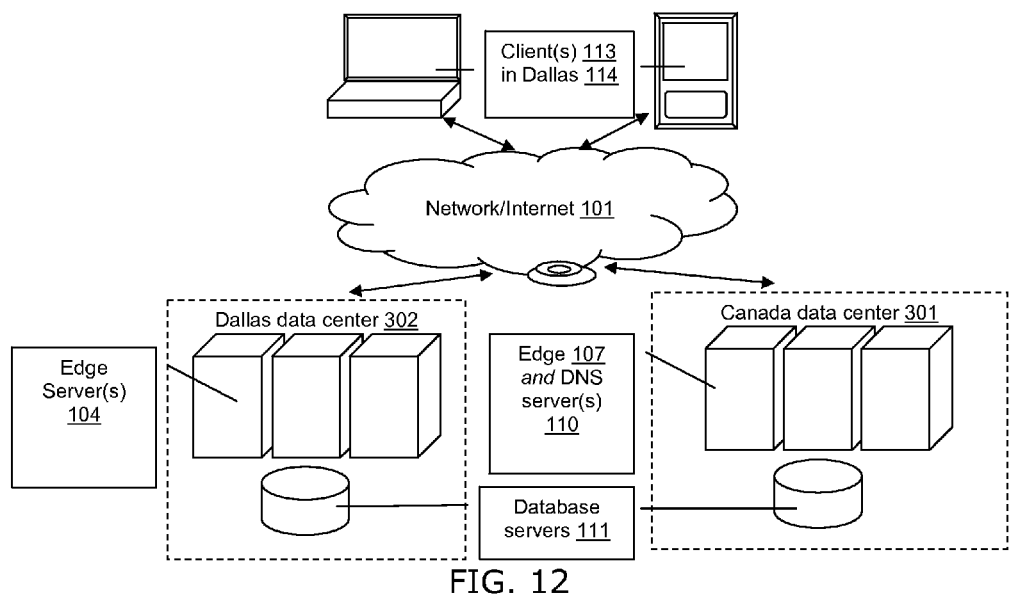
FIG. 12 is an example embodiment of a system for registering a domain name with a domain name registrar communicatively coupled to the Internet.

As seen in the non-limiting example embodiment in FIG. 12, after registering a domain name (e.g., example.com) with a domain name registrar, a registrant may develop a website 103 and pay a hosting provider to host the website 103 on the hosting provider's hosting servers, which are communicatively coupled to the Internet. As a non-limiting example, the domain name registrar and hosting provider may be a single service provider, such as GODADDY.COM.

During the domain name registration and website hosting process, example.com's registrant may choose to subscribe example.com to one or more CDNs. The appropriate information for the registered domain name may be updated in the DNS. Specifically, the appropriate DNS zone file(s) may be updated to include a DNS zone for example.com. This information may include the domain name, the A and/or AAAA-records and a designation that the domain name is subscribed to one or more CDNs as follows:

| | |
|---|---|
| $ORIGIN example.com. | ; start of this zone file in the namespace |
| example.com. IN | ; example.com used on Internet |
| example.com NS ns | ; ns.example.com is a name server for example.com |
| example.com A 192.0.2.1 | ; IPv4 address for example.com |
| example.com AAAA 2001:db8:10::1 | ; IPv4 address for example.com |
| www. CNAME example.com | ; www.example.com is an alias for example.com |
| CDN 01 example.com. | ; example.com is marked as subscribed to CDN01. |

One or more DNS servers 110 within CDN01 may use the DNS zone file, any previously entered static routes and/or any existing routing protocols, possibly within a provisioning system in the CDN, to generate a routing table 112. The routing table 112 may include at least the following information:

| CDN | Behavior | Location | A | A-Backup |
|---|---|---|---|---|
| 01 | Off | Default-Phoenix | 70.1.1.1&2 (phx cdn) | 60.1.1.1&2 (dal cdn) |
| 01 | Primary | Default-Texas | 60.1.1.1&2 (dal cdn) | 50.1.1.1&2 (can cdn) |
| 01 | Backup | Default-Canada | 50.1.1.1&2 (can cdn) | 60.1.1.1&2 (dal cdn) |

This routing table may be replicated, possibly via a replication chain, to the DNS server(s) 110 within the CDN and may be temporarily stored in cache memory in the DNS server(s) 110. The network 101 hardware and software used to replicate the routing table 112 may be configured to keep the replicated data synchronized and up to date, possibly by transmitting new copies of the replication table 112 to the DNS server(s) 110. If a hangup signal is detected (indicating there has been a loss of connection between the master copy of the routing table 112 and the replicated data for the routing table 112), the replicated data may be refreshed and/or re-transmitted to the DNS server(s) 110 so that the data remains current.

A client computer, for example, in the Dallas, Tex. area, may request content from the website 103, possibly using an HTTP and/or TCP request, to resolve the example.com to the website 103. The DNS server(s) 110 may perform an IP geolocation to determine the geographic location (in this case, Dallas) of the client 113, the ISP of the client 400 or another DNS server 110 associated with the client 113 that issued the request.

In response to this request, the CDN (possibly via the DNS server(s) 110) may query the routing table 112 stored within a database on a database server (possibly running on network storage device 111) or within the cache of the DNS server(s) 110, for a behavior, an address record, a backup address record or any other routing data corresponding to the CDN for example.com and Dallas, Tex., the location of the client. As a non-limiting example, the DNS server(s) 110 may query the routing table 112 using the following SQL query: "SELECT Behavior, A, A-Backup FROM tbl WHERE Location=CC OR Location=Default-Dallas ORDER BY Location=CC DESC LIMIT 1."

In alternate examples, if the DNS proxy server(s) 110 determines that no routing table was cached, the DNS proxy(s) 110 may fetch the appropriate DNS zone/zone file for example.com, possibly via an SQL request. If the DNS server(s) 110 search the routing table 112 and/or a DNS zone for example.com and determine that example.com is not mapped to a corresponding CDN, the request may be routed to the origin server 100 for example.com.

Returning to the example comprising a cached routing table 112 wherein example.com is subscribed to a CDN, the DNS server(s) may determine, using the data in the routing table 112, that example.com is subscribed to CDN01. The DNS server(s) 110, having determined that the client sending the request is in Dallas, Tex. and that example.com is subscribed to CDN01, may respond to the request using the stored routing data within the example routing table 112. Specifically, the geographic region 114 for the client 113 is Dallas, Tex., so the DNS server(s) 110 may use the routing table 112 to respond to the client's 113 request using IP Address 60.1.1.1&2 mapped to an edge server containing the website 103 content in the "Default-Texas" geographic area.

The DNS server(s) 110 may further determine how to respond to the request using data from the "Behavior" data field within the routing table 112 to. In this example, for requests that correspond to the behavior data field with an "off" designation, the DNS server(s) 110 may respond to the request to resolve the domain name with an origin server IP address—the Phoenix origin server in this example. For requests that correspond to the behavior data field with a "primary" designation, the DNS server(s) 110 may respond to the request to resolve the domain name with a primary IP address for an edge server—the Texas edge server in this example. For requests that correspond to the behavior data field with a "backup" designation, the DNS server(s) 110 may respond to the request to resolve the domain name with a backup IP address for an edge server—the Canada edge server in this example.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system, comprising
server computer communicatively coupled to a network and configured to:
receive a hypertext transfer protocol (HTTP) request to resolve a domain name;
determine whether a zone file for the domain name comprises a subscription data field identifying a content delivery network to which the domain name is subscribed;
responsive to a determination that the zone file does not comprise the subscription data field:
identify an origin server within an address data field in a routing table generated by a network storage device and stored in a cache of a Domain Name System (DNS) server computer; and
route the HTTP request to the origin server; and
responsive to a determination that the zone file comprises the subscription data field:
identify, via a geolocation of a client internet protocol (IP) address, a geographic region of a client computer that transmitted the HTTP request;
identify, within the routing table:
a location data field comprising a matching geographic region mapped, within the routing table, to a content server; and
a behavior data field associated with the a content server, wherein the behavior data field designates the content server as the origin server, a primary server or a secondary server for the matching geographic region; and
route the HTTP request to the content server.

2. The system of claim 1, wherein the server computer is further configured to:
register the domain name;
host a website resolving from the domain name;
receive a request to subscribe the domain name to the content delivery network; and
update the zone file to include the subscription data field.

3. The system of claim 1, further comprising a plurality of edge servers running in a datacenter not comprising a plurality of DNS servers.

4. The system of claim 1, wherein the network storage device is configured to:
generate, from the zone file, the routing table for the content delivery network; and
transmit and synchronize the routing table in the cache of the DNS server computer.

5. The system of claim 1, wherein said network storage device comprises a database server running a database storing said routing table.

6. The system of claim 5, wherein said database server is configured to transmit said routing table to a plurality of DNS servers.

7. The system of claim 6, wherein each of said plurality of DNS servers comprises a cache memory storing said routing table.

8. The system of claim 7, wherein said routing table is periodically updated in said cache memory in said plurality of DNS servers by said database server.

9. The system of claim 1, wherein the routing table:
maps an edge server to an internet protocol address;
maps the internet protocol address to at least one geographic region.

10. The system of claim 1, wherein the routing table comprises a plurality of data fields comprising:
an identifier for the content delivery network;
a behavior;
a geographic region of the origin server, the primary server and the secondary server;
a primary Internet protocol address for the primary server in the geographic region; and
a backup internet protocol address for an edge server in the geographic region.

11. The system of claim 1, wherein the network storage device is configured to generate the routing table by:
extrapolating a plurality of data from at least one static or dynamic routing protocol; and
determining an internet protocol address and at least one destination hardware resource on which to instantiate the at least one static or dynamic routing protocol.

12. The system of claim 1, wherein the network storage device is configured to generate the routing table by:
identifying the zone file for domain name; and
extrapolating, from the zone file, a plurality of data for generating the routing table comprising:
at least one internet protocol address within an address record;

a location that each of the at least one internet protocol address is assigned to; and the content delivery network within the subscription data field.

13. The system of claim 1, wherein, responsive to a connection loss in the content delivery network, the network storage device is configured to synchronize, via a replication chain, the routing table within the cache of the DNS server.

14. The system of claim 1, wherein the HTTP request further comprises a website content request.

15. The system of claim 1, further comprising a client computer configured to receive, via a domain name or hosting control panel, a request to subscribe the domain name to the content delivery network.

16. A system, comprising:
   a network storage device communicatively coupled to a network and configured to:
      generate and store a routing table for a content delivery network; and
      transmit the routing table to one or more DNS server computers for storage; and
   a server computer communicatively coupled to the network and configured to:
      receive an HTTP request to resolve a domain name;
      determine whether a zone file for the domain name comprises a subscription data field identifying a subscription of the domain name to the content delivery network;
      responsive to a determination that the zone file does not comprise the subscription data field:
         identify an origin server within an address data field in the routing table; and
         route the HTTP request to the origin server;
      responsive to a determination that the zone file comprises the subscription data field:
         identify, via a geolocation of a client IP address, a geographic region of a client computer that transmitted the http request;
         identify, within the routing table:
            a location data field comprising a matching geographic region mapped, within the routing table, to a content server; and
            a behavior data field associated with the a content server, wherein the behavior data field designates the content server as the origin server, a primary server or a secondary server for the matching geographic region; and
         route the HTTP request to the content server.

17. The system of claim 16, wherein said network storage device comprises a database server running a database storing said routing table.

18. The system of claim 17, wherein said database server is configured to generate said routing table.

19. The system of claim 17, wherein said database server is configured to transmit said routing table to said one or more DNS servers via a replication chain.

20. The system of claim 17, wherein said routing table is temporarily stored in said one or more DNS servers in a cache memory.

21. The system of claim 20, wherein said database server is further configured to update said routing table in said cache memory of said one or more DNS server computers in response to a hangup signal.

22. The system of claim 16, wherein a plurality of edge servers is running in a datacenter not comprising a plurality of DNS servers.

* * * * *